(12) United States Patent
Hayes et al.

(10) Patent No.: US 8,720,110 B2
(45) Date of Patent: May 13, 2014

(54) HYDROPONICS EQUIPMENT CLEANING METHOD

(75) Inventors: Brian Hayes, Los Angeles, CA (US); Michael Blasetti, Pacifica, CA (US)

(73) Assignee: BMT Partners, Monarch Beach, CA (US)

( * ) Notice: Subject to any disclaimer, the term of this patent is extended or adjusted under 35 U.S.C. 154(b) by 287 days.

(21) Appl. No.: 13/048,036

(22) Filed: Mar. 15, 2011

(65) Prior Publication Data

US 2012/0233918 A1 Sep. 20, 2012

(51) Int. Cl.
*A01G 31/00* (2006.01)

(52) U.S. Cl.
USPC .............................. 47/62 E; 47/59 R; 47/61

(58) Field of Classification Search
USPC ....... 47/59 R, 62 R, 62 A, 62 C, 62 E, 64, 61, 47/63, 60
See application file for complete search history.

(56) References Cited

U.S. PATENT DOCUMENTS

| 4,045,909 | A |   | 9/1977  | Moss |
| 4,107,875 | A |   | 8/1978  | Bordine |
| 4,299,054 | A | * | 11/1981 | Ware ................................. 47/64 |
| 4,407,092 | A | * | 10/1983 | Ware ................................. 47/64 |
| 4,908,985 | A |   | 3/1990  | Dowell |
| 5,067,275 | A | * | 11/1991 | Constance .................... 47/62 E |
| 5,269,094 | A | * | 12/1993 | Wolverton et al. ............ 47/66.6 |
| 5,355,618 | A |   | 10/1994 | Pedersen |
| 5,525,505 | A | * | 6/1996  | Young et al. .................. 435/430 |
| 5,597,731 | A | * | 1/1997  | Young et al. ............... 435/284.1 |
| 5,826,374 | A |   | 10/1998 | Baca |
| 7,918,186 | B2 | * | 4/2011 | Rowe et al. .................... 119/246 |
| 2008/0078118 | A1 | * | 4/2008 | Bissonnette et al. .............. 47/63 |

* cited by examiner

*Primary Examiner* — Kristen C Hayes
(74) *Attorney, Agent, or Firm* — Temmerman Law Office; Mathew J. Temmerman

(57) ABSTRACT

A business method comprising a step by step procedure for quick, clean and efficient cleaning of hydroponics growing ("Flood") trays. The method essentially comprises the use of a custom-fitted tray insert of a lightweight material designed to fit inside the much heavier-duty hydroponics growing tray. After the plants are grown, the lightweight insert tray is removed and discarded, thus saving the manual labor of cleaning and sanitizing the heavy-duty growing tray before the next use.

10 Claims, 3 Drawing Sheets

HYDROPONICS EQUIPMENT CLEANING METHOD

CROSS-REFERENCE TO RELATED APPLICATIONS

N/A

STATEMENT REGARDING FEDERALLY SPONSORED RESEARCH

N/A

THE NAMES OF THE PARTIES TO A JOINT RESEARCH AGREEMENT

N/A

INCORPORATION-BY-REFERENCE OF MATERIAL SUBMITTED ON A COMPACT DISC

N/A

Figure 1:
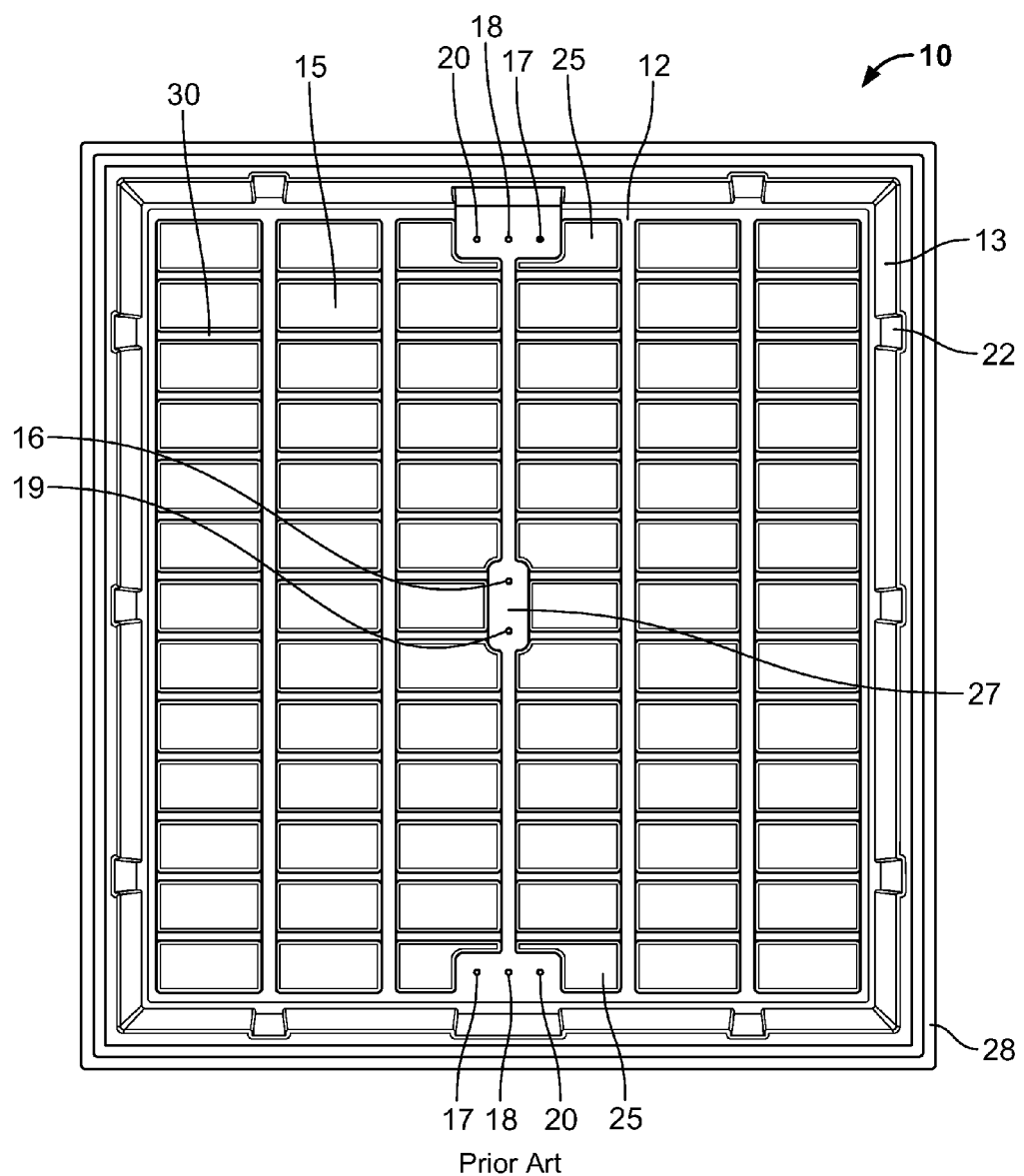

BACKGROUND OF THE INVENTION (1) Field of the Invention

The field of the invention is that of hydroponics gardening, specifically for all hydroponic gardening using hydroponic trays, which is well-known in the art. The invention can be used in all trays whether it is a drip system, ebb and flow, aeroponics, etc. For example in ebb and flow, the plants are grown in blocks or small pots filled. The nutrient solution is stored in the reservoir and is pumped up to the tray with a submersible pump through the fill/drain fitting. The pump is controlled with a timer that turns on a few times per day, or often enough to keep the growing media moist all the time. The pump only needs to run long enough to reach the top of the overflow fitting. When the pump turns off the solution flows back down the fill/drain fitting and out the pump. The amount of solution that goes into the tray is controlled by the overflow fitting. Ebb and flow is one of the most reliable and easy to build hydroponic systems.

(2) Description of Related Art including information disclosed under 37 CFR 1.97 and 1.98

U.S. Pat. No. 4,045,909 "HYDROPONIC NUTRIENT FEEDING AND DRAINING SYSTEM" Registered Sep. 6, 1977 to Moss, discloses:

"Hydroponic nutrient solution is fed to a growing bed by means of a pump withdrawing liquid nutrient solution from a supply reservoir located below the bed. The nutrient solution is rapidly drained from the bed when the pump is deenergized through a dump valve having no moving parts which bypasses the solution draining from the bed directly into the supply reservoir. The dump valve consists of a hollow body having at least one drain aperture. A stream of nutrient solution under pressure passes through a nozzle in the inlet of the valve body and is discharged into the outlet of the valve body. When the pump is deenergized, a major portion of the solution draining from the growing bed passes through the aperture and drains directly into the reservoir."

This disclosure is for the "ebb and flow" design, but there is nothing in this patent about a method for cleaning.

U.S. Pat. No. 4,107,875, "GREENHOUSE EQUIPMENT", registered Aug. 22, 1978, to Bordine, discloses:

"An assembly for supplying a nutrient solution, such as water, to plants supported on a greenhouse bench, which retains the solution supplied thereto from a reservoir disposed immediately beneath the bench. A main source of liquid, such as water, is supplied through a main valve to a float-operated valve within the reservoir for maintaining a predetermined level of the solution within the reservoir. Also included is a fluid line interconnecting the bench and a pump disposed within the reservoir whereby the solution may be pumped to the bench through a check valve in the line and which prevents reverse flow. Also attached to the line is a solenoid actuated drain valve which drains the solution from the flooded bench and back into the reservoir. A control timer controls the operation of the main valve and the pump and the solenoid actuated valve to close the main valve and, thereafter, actuate the pump for pumping the solution from the reservoir to the bench for a predetermined period of time after which the solenoid valve is opened to drain the bench back into the reservoir whereupon the main valve is opened allowing the reservoir to be replenished through the float-operated valve. A reservoir is associated with each bench and a plurality of reservoirs are supplied liquid from the main valve whereby the solution in each reservoir bench combination or pair is isolated from the solution of every other reservoir bench combination or pair." This patent is also related and covers hydroponics methods, but there is nothing in this patent about a method for cleaning.

U.S. Pat. No. 4,908,985, "SYSTEM AND APPARATUS FOR HYDROPONIC GARDENING", registered Mar. 20, 1990 to Dowell, discloses: "A hydroponic gardening system includes an apparatus for supporting the growth of selected plants, which apparatus includes a housing having a lower-level nutri-ent tank and a plant support tray with a dual-level aeration chamber therein. Seed germination cubes are positioned on the tray adjacent the aeration chambers, and a uniquely designed capillary mat overlies the floor in both levels of the aeration chamber and underneath the seed germination cubes. End portions of the capillary mat extend down into the nutrient tank. Nutrient is conducted from the tank through the capillary mat to the plant root system which develops and grows in the aeration chambers. While the root system is nourished and moistened by the capillary flow of nutrient fluids from the nutrient tank into the aeration chamber, the structure of the dual-level aeration chamber is such that the roots are maintained in an environment of freely circulating air and conditions of 100 percent humidity." This patent is also related and covers hydroponics methods, but there is nothing in this patent about a method for cleaning.

U.S. Pat. No. 5,355,618, "IRRIGATION VALVE FOR A CULTNATION TABLE AND RELATED IRRIGATION SYSTEM", registered Oct. 18, 1994 to Pedersen, discloses: "An irrigation valve adapted to be placed in an inlet pipe for irrigation liquid under a cultivation table for potted plants or the like. The irrigation valve includes a valve housing with an inlet and an outlet as well as a mixing chamber and a nozzle. The valve further includes a lateral opening for enabling an introduction of air to be mixed with the irrigation liquid and for draining of irrigation liquid. A number of the valves may be used in an irrigation plant with one valve being provided under each cultivation table and being activated by a magnetic valve disposed in an inlet pipe for providing water under pressure." This patent is also related and covers hydroponics equipment, but there is nothing in this patent about a method for cleaning.

U.S. Pat. No. 5,826,374, "HYDROPONIC GARDEN APPARATUS", registered Oct. 27, 1998 to Baca, discloses: "Automated hydroponic plant growing apparatus for providing an equal supply of nutrient solution, at a controlled rate, to plants in each of a plurality of individual growth chambers, with provision of flow irrigation of each plant in each chamber. The apparatus provides for fully powered, pressurized flow of nutrient solution through separate lines to each growth chamber, and provides for automatic maintenance of equal levels of nutrient solution in the various chambers of the system, having return flow lines for return of any excess accumulation of nutrient solution from anyone growth chamber to the central distribution chamber. Through provision of pressurized flow of nutrient solution to the growth chambers, the system avoids any need to rely even in part on gravity flow of nutrient solution, and so may be used with all components located on a single level, e.g. all resting on a common floor. A Timer controls the pump which pressurizes the nutrient solution flow to the growth chambers, so that nutrient solution will be provided to all of the plants at a desired rate. Return flow lines surround and enclose the lines for flow of nutrient solution to the growth chambers, so as to halve the line clutter associated with these lines." Again, there is nothing in this patent about a method for cleaning.

BRIEF SUMMARY OF THE INVENTION

This invention is for a business method in which is disclosed a step by step procedure for quick, clean and efficient cleaning of hydroponics growing ("Flood") trays. The method essentially comprises the use of a custom-fitted tray insert of a lightweight plastic material designed to overlay the much heavier-duty hydroponics growing tray. After the plants are grown, the lightweight insert tray is removed and discarded, thus saving the manual labor of cleaning and sanitizing the heavy-duty growing tray before the next use.

BRIEF DESCRIPTION OF THE SEVERAL VIEWS OF THE DRAWING(S)

FIG. 1—shows a top view of a typical hydroponics growing tray, often referred to as a flood tray FIG. 2—shows a view with a side cutout of a Flood tray and the connectors and reservoir below the flood tray FIG. 3—shows a view of the physical portion of the cleaning method of the invention with the lightweight insert cleaning tray on top of the usual flood tray

DETAILED DESCRIPTION OF THE INVENTION

Reference Numerals

10—Flood Tray used by hydroponics growers using an "ebb and flow" setup with continuous water and nutrient supply to the Flood Tray 10, where the plants are placed and water and nutrients supplied continuously.
12—Base of the Flood Tray 10 that supports the weight of plants and nutrients, usually on a table or other support
13—Flood Tray Sidewall is one of the four sidewalls to the Flood Tray 10 which are raised up from the Base 12 to retain the fluids for the growing plants placed in the Flood Tray(s) 10
15—Raised Plant Support is one of the Raised Plant Supports 15 repeated in rows and columns on the Base 12 of the Flood Tray 10, upon which a plant can be placed and around which are the Gully Channels 30 which afford the flow of the water and nutrient solution between the Raised Plant Supports 15
17—Input Flow Opening is the opening for an Input Tube 33 supplying the water and nutrient solution to the Flood Tray 10 from the Reservoir 35
20—Output Flow Opening is the opening for the Output Tube 37 from the Flood Tray 10 to the Reservoir 35 with the water and nutrient solution
22—Flood Tray Sidewall Channel is the indentations on the Flood Tray Sidewalls 13
25—End Plant Support Tube Opening is the combination of the raised support and the flat cutout portion on the Base 12 that accommodates both the Input Flow Opening 17 and the Output Flow Opening 20, and will be at both ends of the long side of the Flood Tray 10
27—Center Plant Support Tube Opening is the same as either End Plant Support Tube Opening 25, but is square and in the center of the Flood Tray 10
28—Flood Tray Lip is the flat portion at the top of each of the four Flood Tray Sidewalls 13 that are uniformly around the Flood Tray 10, and which has the Raised Bump 40 as one of its features, which Bump 40 is continuously repeated along the four Flood Tray Sidewalls 13 so as to provide extra support for the Flood Tray Sidewalls 13 and to retain slight overflows of fluids
30—Gully Channel which are the flat channels between the Raised Plant Supports 15 that afford the flow of the water and nutrient solution between the Raised Plant Supports 15 and the Tube Openings 25, 27
33—Input Tube supplying the water and nutrient solution to the Flood Tray 10 from the Reservoir 35
35—Reservoir with the stored source for growing the plants with the water and nutrient solution
37—Output Tube from the Flood Tray 10 to the Reservoir 35 with the flow of water and nutrients solution
40—Raised Bump is a feature of the Flood Tray Sidewalls 13, which Bump 40 is continuously repeated along the four Flood Tray Sidewalls 13 so as to provide extra support for the Flood Tray Sidewalls 13 and to retain slight overflows of fluids
45—Pump is the electric pump which pumps the nutrient and water solution from the reservoir 35 into the flood tray 10
50—Lightweight Insert Cleaning Tray is the feature of the invention used to clean the Flood Tray 10, and is configured identically, but slightly smaller than the Flood Tray 10, so as to be form-fitting when placed on top of the Flood Tray 10 prior to planting. Also, it is made of a much less expensive material than the usual flood tray 10 so as to be discarded after use.

DETAILED DESCRIPTION OF THE DRAWINGS

FIG. 1—Discloses a view from the top of a typical hydroponics growing tray, often referred to as a flood tray 10. The flood tray 10 is typically square in shape comprised of: The Base 12 of the Flood Tray 10 that supports the weight of plants and nutrients, usually on a table or other support. The Flood Tray Sidewall 13 is one of the four sidewalls to the Flood Tray 10 which are raised up from the Base 12 to retain the fluids for the growing plants placed in the Flood Tray(s) 10. The Raised Plant Support 15 is repeated in rows and columns on the Base 12 of the Flood Tray 10, upon which a plant can be placed and around which are the Gully Channels 30 which afford the flow of the water and nutrient solution between the Raised Plant Supports 15. The Input Flow Opening 17 s the opening for an Input Tube 33 supplying the water and nutrient solution to the Flood Tray 10 from the Reservoir 35. The Output Flow Opening 20 is the opening for the Output Tube 37 from the Flood Tray 10 to the Reservoir 35 with the water and nutrient solution. The Flood Tray Sidewall Channel 22 is the indentation on the Flood Tray Sidewalls 13. The End Plant Support Tube Opening 25 is the combination of the raised support and the flat cutout portion on the Base 12 that accommodates both the Input Flow Opening 17 and the Output Flow Opening 20, and will be at both ends of the long side of the Flood Tray 10. The Center Plant Support Tube Opening 27 is the same as either End Plant Support Tube Opening 25, but is square and in the center of the Flood Tray 10. The Flood Tray Lip 28 is the flat portion at the top of each of the four Flood Tray Sidewalls 13 that are uniformly around the Flood Tray 10, and which has the Raised Bump 40 (FIG. 2, 3) as one of its features, which Bump 40 (FIG. 2, 3) is continuously repeated along the four Flood Tray Sidewalls 13 so as to provide extra support for the Flood Tray Sidewalls 13 and to retain slight overflows of fluids.

Figure 2:
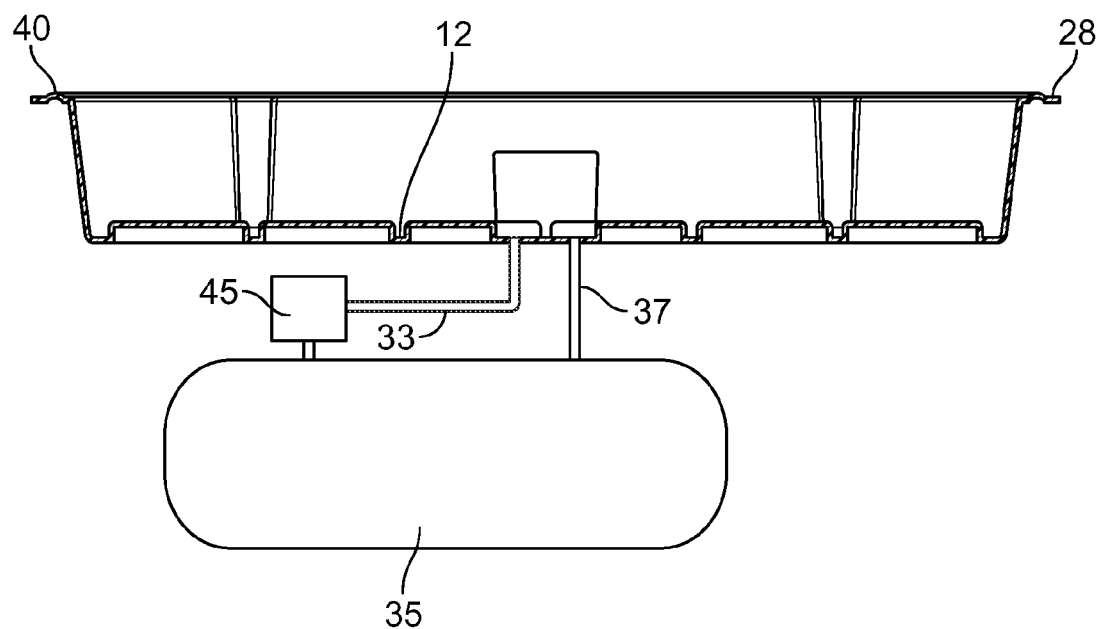

FIG. 2—Shows the view with a side cutout of a Flood tray 10 above and the connectors and reservoir 35 below the flood tray. The Flood Tray Sidewall 13 (FIG. 1) is one of the four sidewalls to the Flood Tray 10 which are raised up from the Base 12 to retain the fluids for the growing plants placed in the Flood Tray(s) 10. The Raised Plant Support 15 (FIG. 1) is repeated in rows and columns on the Base 12 of the Flood Tray 10, upon which a plant can be placed and around which are the Gully Channels 30 (FIG. 1) which afford the flow of the water and nutrient solution between the Raised Plant Supports 15 (FIG. 1). The Input Tube 33 is connected between the pump 45 and the base 12 of the flood tray 10 and supplies the water and nutrient solution to the Flood Tray 10 from the Reservoir 35. The Reservoir 35 is the stored source for the water and nutrient solution. The Output Tube 37 is connected from the base 12 of the Flood Tray 10 to the Reservoir 35 affording a flow of water and nutrients solution between them. The Flood Tray Lip 28 is the flat portion at the top of each of the four Flood Tray Sidewalls 13 (FIG. 1) that are uniformly around the Flood Tray 10, and which has the Raised Bump 40 as one of its features, which Bump 40 is continuously repeated along the four Flood Tray Sidewalls 13 (FIG. 1) so as to provide extra support for the Flood Tray Sidewalls 13 and to retain slight overflows of fluids.

Figure 3:
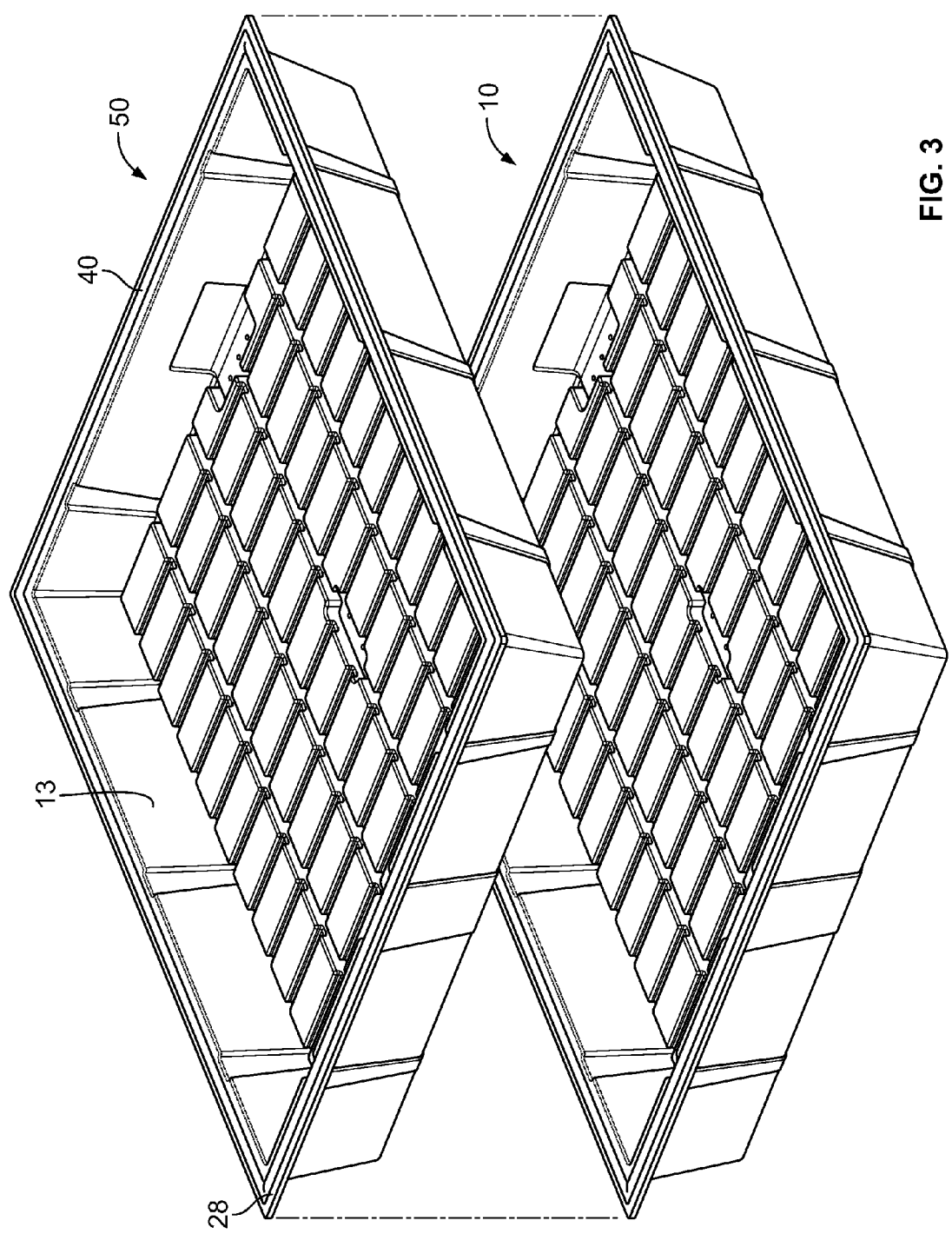

FIG. 3—Shows the view of the physical portion of the cleaning method of the invention with the lightweight insert cleaning tray 50 above the flood tray 10. The lightweight insert cleaning tray 50 is designed to be identical in all respects with the usual flood tray 10, except that the lightweight insert cleaning tray 50 is slightly smaller so as to fit snugly inside the usual flood tray 10, and it is made of a much less expensive material than the usual flood tray 10 so as to be discarded after use. FIG. 3 shows major features of the lightweight insert cleaning tray including the Raised Bump 40, the Flood Tray Sidewall 13 and the Flood Tray Lip 28.

DETAILED DESCRIPTION OF THE INVENTION METHOD

In a typical hydroponics growing scenario, the grower places the plants into the flood tray 10 on the Raised Plant Supports 15 which are repeated in rows and columns on the Base 12 of the Flood Tray 10, around which plant supports 15, are the Gully Channels 30 which afford the flow of the water and nutrient solution between the Raised Plant Supports 15.

When the plants are grown, the grower is then faced with the tedious and time-consuming task of cleaning the flood tray 10, or discarding the expensive flood tray 10 to avoid the work of cleaning it.

In the present invention, the time-intensive dirty job of cleaning is eliminated. Instead, using the method of the present invention, before the grower places the plants into the flood tray 10 on the Raised Plant Supports 15, the grower first inserts the lightweight insert cleaning tray 50 into the flood tray 10, as shown in FIG. 3.

With the lightweight insert cleaning tray 50 placed inside the flood tray 10, the grower then proceeds with all the usual tasks of setting up the flood tray 10 for growing the plants as described and shown in FIGS. 1 and 2, but now all of the operations are performed on the combination of inserted lightweight insert cleaning tray 50 which is inside the flood tray 10 and said combination can be treated as a single flood tray 10 would have been treated for growing purposes.

The difference with the present invention method is now in the cleaning and reuse of the flood tray 10 phase. Here, the lightweight insert cleaning tray 50 that was placed inside the flood tray 10 at the start of the growing phase, is now removed and discarded. The grower then starts a new growing phase by repeating the steps for the growing phase as before, but this time the grower starts with a fresh lightweight insert cleaning tray 50 and re-uses the more expensive flood tray 10.

We claim:

1. A method of cleaning a hydroponics growing system having at least one growing flood tray, the method comprising the steps of:
   a. placing a lightweight cleaning tray inside each at least one growing flood tray, wherein each said lightweight cleaning tray is configured identically to but is slightly smaller than each at least one growing flood tray;
   b. growing plants in each lightweight cleaning tray inside each at least one growing flood tray as if each lightweight cleaning tray inside each at least one growing flood tray were a single growing flood tray;
   c. removing said plants from each lightweight cleaning tray inside each at least one growing flood tray; and
   d. discarding each lightweight cleaning tray.

2. The method according to claim 1 wherein said hydroponics growing system employs a drip system.

3. The method according to claim 2 further comprising the step of: repeating steps a. b. c. and d.

4. The method according to claim 1 wherein said hydroponics growing system employs an aeroponics system.

5. The method according to claim 4 further comprising the step of: repeating steps a. b. c. and d.

6. The method according to claim 1 wherein said hydroponics growing system employs an ebb and flow system.

7. The method according to claim 6 further comprising the step of: repeating steps a. b. c. and d.

8. The method according to claim 1 further comprising the step of: repeating steps a. b. c. and d.

9. A method of cleaning a hydroponics growing system having at least one growing flood tray, the method comprising the steps of:
   a. placing a lightweight cleaning tray inside each at least one growing flood tray;
      wherein each said lightweight cleaning tray is configured identically to but is slightly smaller than each at least one growing flood tray;
   b. with a drip system, growing plants in each lightweight cleaning tray inside each at least one growing flood tray as if each lightweight cleaning tray inside each at least one growing flood tray were a single growing flood tray;
   c. removing said plants from each lightweight cleaning tray inside each at least one growing flood tray; and
   d. discarding each lightweight cleaning tray.

10. A method of cleaning a hydroponics growing system having at least one growing flood tray, the method comprising the steps of:

a. placing a lightweight cleaning tray inside each at least one growing flood tray;
   wherein each said lightweight cleaning tray is configured identically to but is slightly smaller than each at least one growing flood tray;
b. with an aeroponics system, growing plants in each lightweight cleaning tray inside each at least one growing flood tray as if each lightweight cleaning tray inside each at least one growing flood tray were a single growing flood tray;
c. removing said plants from each lightweight cleaning tray inside each at least one growing flood tray; and
d. discarding each lightweight cleaning tray.

\* \* \* \* \*